United States Patent
Kang et al.

(10) Patent No.: US 6,922,461 B2
(45) Date of Patent: Jul. 26, 2005

(54) INSPECTION SYSTEM FOR AIR CARGOES OR VEHICLES

(75) Inventors: Kejun Kang, Beijing (CN); Wenhuan Gao, Beijing (CN); Jianmin Li, Beijing (CN); Zhiqiang Chen, Beijing (CN); Yinong Liu, Beijing (CN); Yuanjing Li, Beijing (CN); Chuanxiang Tang, Beijing (CN); Junli Li, Beijing (CN); Li Zhang, Beijing (CN); Jianjun Su, Beijing (CN); Rongxuan Liu, Bejing (CN)

(73) Assignees: Tshinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 10/774,366

(22) Filed: Feb. 10, 2004

(65) Prior Publication Data

US 2004/0213374 A1 Oct. 28, 2004

Related U.S. Application Data

(63) Continuation of application No. PCT/CN02/00563, filed on Aug. 14, 2002.

(30) Foreign Application Priority Data

Aug. 14, 2001 (CN) .......................................... 01124111 A

(51) Int. Cl.⁷ .............................................. G01N 23/00
(52) U.S. Cl. ...................................... 378/57; 250/359.1
(58) Field of Search .............................. 378/57, 54, 68, 378/69, 208; 250/359.1, 360.1, 358.1; 244/137.1; 414/389

(56) References Cited

U.S. PATENT DOCUMENTS

| | | | | |
|---|---|---|---|---|
| 4,599,740 A | * | 7/1986 | Cable | 378/57 |
| 4,722,096 A | * | 1/1988 | Dietrich et al. | 378/57 |
| 4,832,559 A | | 5/1989 | Gebbardt | |
| 5,065,418 A | * | 11/1991 | Bermbach et al. | 378/57 |
| 5,331,118 A | * | 7/1994 | Jensen | 177/25.14 |
| 5,838,758 A | * | 11/1998 | Krug et al. | 378/53 |
| 5,974,111 A | * | 10/1999 | Krug et al. | 378/57 |
| 6,031,890 A | | 2/2000 | Bermbach et al. | |
| 6,218,943 B1 | * | 4/2001 | Ellenbogen | 340/572.4 |
| 6,347,132 B1 | * | 2/2002 | Annis | 378/57 |

FOREIGN PATENT DOCUMENTS

| | | |
|---|---|---|
| CN | 1133440 A | 10/1996 |
| CN | 1197209 A | 10/1998 |
| CN | 2432189 | 5/2001 |
| GB | 2 193 073 A | 2/1988 |

* cited by examiner

*Primary Examiner*—Edward J. Glick
*Assistant Examiner*—Hoon Song
(74) *Attorney, Agent, or Firm*—Burns, Doane, Swecker & Mathis, L.L.P.

(57) ABSTRACT

An inspection system for air cargoes, in which an accelerator, a collimator, and a vertical detector arm are all mounted on the floor; detectors are provided within both the horizontal detector arm and the vertical arm; the accelerator, the collimator, the horizontal detector arm and the vertical detector arm are provided in a same plane; the horizontal detector arm is supported by the upper end of the collimator, the vertical detector arm and the horizontal detector arm are connected to each other and provided in the side opposite to the accelerator; a stable portal-shaped frame is formed by means of the collimator, the horizontal detector arm and the vertical detector arm; the conveying device is located under the horizontal detector arm, being perpendicular to the portal-shaped frame, the collimator is provided between the conveying device and the frame.

8 Claims, 4 Drawing Sheets

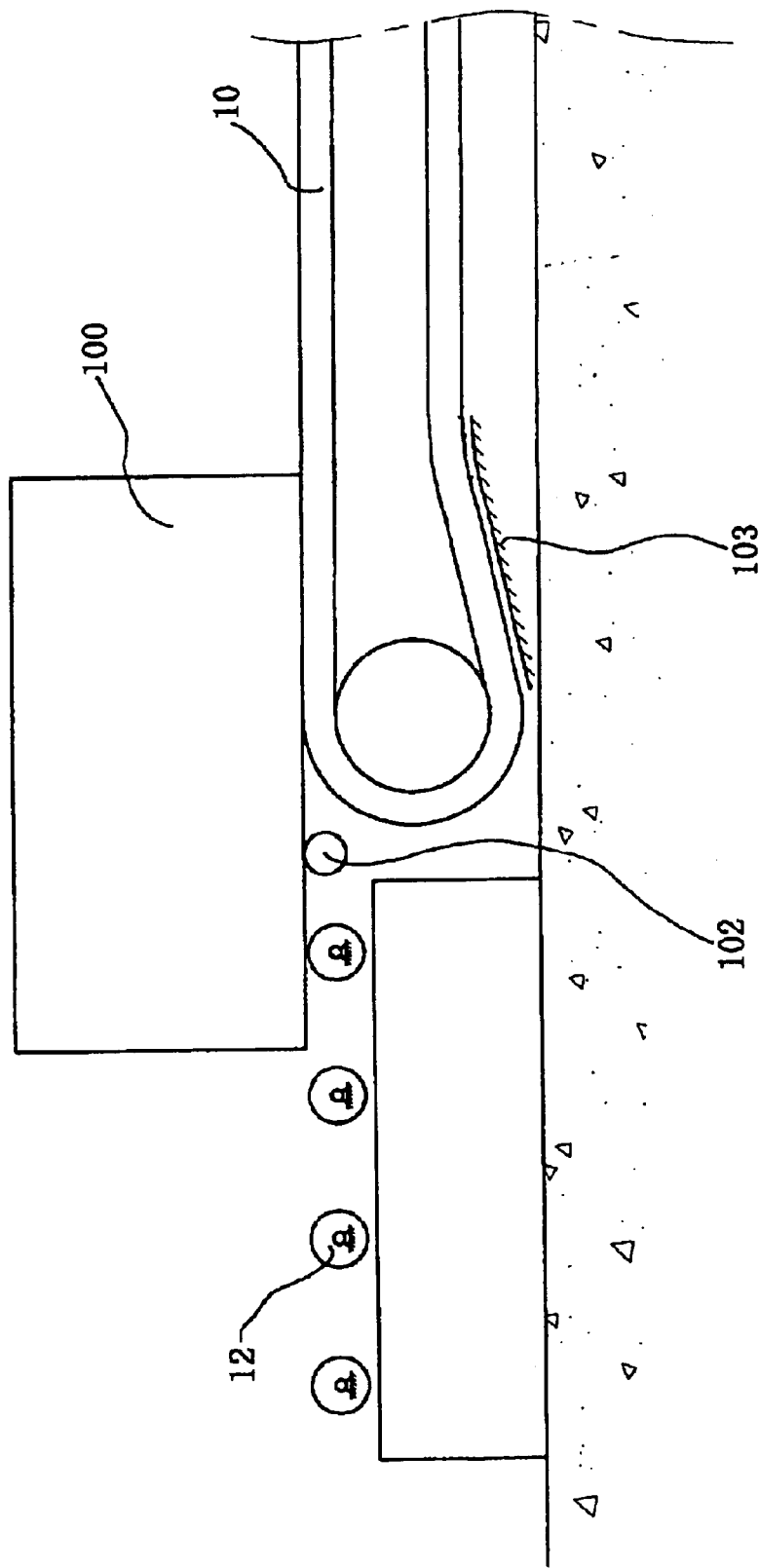

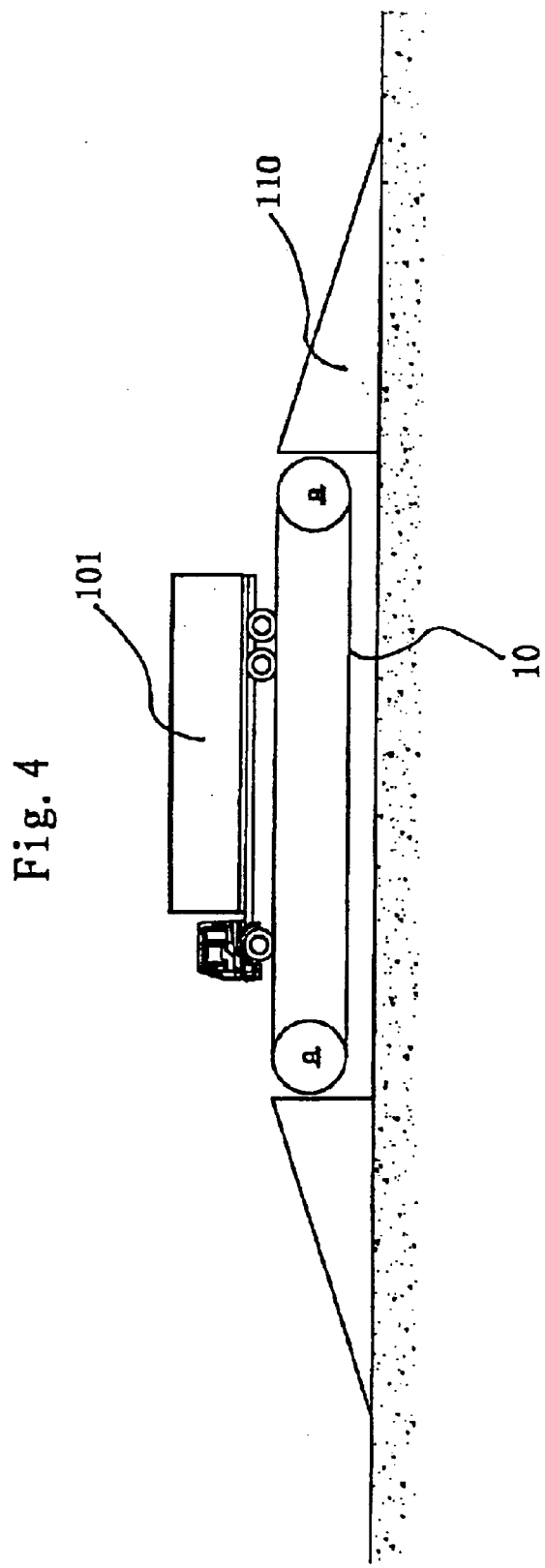

INSPECTION SYSTEM FOR AIR CARGOES OR VEHICLES

The present application is a continuation of PCT/CN02/00563, filed on Aug. 14, 2002, and which claims the priority of Chinese Patent Application No. 01124111.X, filed in China on Aug. 14, 2002. The contents of PCT/CN02/00563 and CN 01124111.X are incorporated herein by reference.

FIELD OF THE INVENTION

The present invention relates to an auto radiation scanning inspection system for large objects, and more particularly, to an inspection system for air cargoes or vehicles, in which the air cargoes or vehicles can be fully examined once passing through the inspection system.

In the present application, the term "air cargoes" refers to the goods contained in air containers, or several goods loaded on a pallet or a receptacle etc. for being monitored together. Such kinds of goods are prepared for carriage by air.

PRIOR ART

The inspection system for air cargoes or vehicles is one of the inspection devices employed by customs. Currently, the goods for air transportation are inspected by a customs officer after the container is opened or by an X-ray tube examining instrument. If inspecting a container by opening it at first, it lasts a long time, so not too many containers can be finished inspection in a unit time, and high costs for the inspection occurs. On the other hand, if inspecting a container by the X-ray tube examining instrument in which an image is formed mainly by reflection, as the energy of the X-ray is low and the penetrating ability thereof is poor, only the objects located 20–30 cm from the inner surface of the container wall facing the X-ray source can be obtained clear images, therefore, the images are not desired and the method cannot be used for the most customs users. To overcome the above drawbacks, in several countries, the accelerator or $^{60}Co$ have been used for large container inspection systems, such as those manufactured by Heimann Systems GmbH and British Aerospace PLC, in which a high energy X-ray radiation source and an array of detectors for receiving the X-rays penetrating through the container are fixed in a scanning tunnel with shielding walls, a special pulling device is employed so as to move the container to pass through the scanning tunnel. During the container passes through the X-ray beam, the detectors receive the X-rays penetrating through the container, then the density distribution of the objects in the container is obtained according to the received X-ray intensity variations, then the data on the received X-ray intensity are transformed into the data on the image gray levels. As a result, the radiographic image of goods contained in the container is obtained. Such kinds of container inspection system needs a huge pulling device to pull the container carrying vehicle or to pull the radiation source, the detectors and the collimator, etc. to move on the tracks forward and backward with the help of the special pulling device.

The Chinese Utility Model 00233357.0 discloses a chain-plank conveyor of a fixed container inspection system to replace with the above-mentioned pulling device. However, to carry the container to pass through the scanning tunnel by means of the chain-plank conveyor, the container must be loaded onto the chain-plank conveyor and unloaded from the chain-plank conveyor with the help of a powerful forklift. Unfortunately, the airports usually use idle roller conveyors, not the forklift, to convey the air cargoes. In addition, thick cement walls or large forbidden area are necessary to protect the operators and the instruments from radiation. In a word, the prior art has such disadvantages as large construction area, high construction cost, inconvenient maintenance, and low inspection efficiency.

SUMMARY OF THE INVENTION

The object of the present invention is to provide an inspection system for air cargoes or vehicles, in which it is not necessary to open the container or vehicle for inspection, so as to improve the inspection efficiency.

The additional object of the present invention is to provide an inspection system for air cargoes or vehicles, in which the air cargoes or vehicles can be fully examined once passing through the system.

The additional object of the present invention is to provide an inspection system for air cargoes or vehicles, which is safe for operators to operate the system.

The additional object of the present invention is to provide an inspection system for air cargoes or vehicles, which is of quick inspection.

The additional object of the present invention is to provide an inspection system for air cargoes or vehicles, in which a high resolution can be realized so as to obtain a very clear image.

In order to resolve the above drawbacks, according to the present invention, there is provided an inspection system for air cargoes or vehicles with an accelerator as its radiation source, mainly comprising an electronic linear accelerator, detectors, a collimator, a horizontal detector arm, a vertical detector arm, a conveying device, radiation shielding walls, an instrument cabin, and a workroom, in which a scanning control module, an image data acquisition module and an operation & inspection module are provided in the instrument cabin, the panel and its control system are provided in the workroom, and the accelerator, the collimator and the vertical detector arm are respectively provided on the accelerator base, the collimator base and the vertical detector arm base, characterized in that the detectors are provided within both the horizontal detector arm and the vertical detector arm, the accelerator, the collimator, the horizontal detector arm and the vertical detector arm are provided in the same plane, the horizontal detector arm is supported by the upper end of the collimator, the vertical detector arm and the horizontal detector arm are connected to each other and provided in the side opposite to the accelerator, a stable portal-shaped frame is formed by means of the collimator, the horizontal detector arm and the vertical detector arm, the conveying device is located under the horizontal detector arm, being perpendicular to the portal-shaped frame, the collimator is provided between the conveying device and the accelerator, a scanning tunnel is enclosed by the portal-shaped frame and the conveying device, radiation shielding walls are provided on both sides of the scanning tunnel, and the instrument cabin and the workroom are provided outside of the radiation shielding wall.

The conveying device according to the present invention is composed of a roller conveyor and a chain-plank conveyor, in which the roller conveyor is composed of a loading roller conveyor and an unloading roller conveyor, and a transition means is used to smoothly bridging the loading roller conveyor and the chain-plank conveyor or bridging the chain-plank conveyor and the unloading roller conveyor.

The conveying device according to the present invention can be only the roller conveyor or only the chain-plank conveyor.

One radiation shielding wall according to the present invention is connected to another by a lap joint. The radiation shielding wall has an inner wall and an outer wall. A lead plate is sandwiched between the inner wall and the outer wall. And the inner wall and the outer wall are provided with ribs thereon to strengthen the radiation shielding wall.

In operation, the conical X-ray beam radiated from the accelerator is transformed to the fan-shaped X-ray beam by means of the collimator. The X-ray beam passing through the collimator becomes the fan-shaped X-ray beam which is perpendicular to the floor. The tips of the detectors provided within the horizontal detector arm and the vertical detector arm are in the same plane as the fan-shaped X-ray beam. During the conveying device carries the container or vehicle being inspected to pass through the X-ray beam in the scanning tunnel, the X-ray beam radiated from the accelerator is transformed to the fan-shaped X-ray beam after passing through the collimator, then the container being inspected is penetrated by the fan-shaped X-ray beam, then the X-ray beam passing through the container is received by the detectors provided within the horizontal detector arm and the vertical detector arm, then the X-ray beam received by the detectors is transformed to electrical signals which are input into the image data acquisition module provided in the instrument cabin, and then the image signals are transferred to the operation & inspection module by the image data acquisition module. As a result, the radiographic image of goods contained in the container is displayed on a computer screen on the console of the workroom. During the whole inspection cycle, instructions are sent out from the console, and the inspecting cycle is automatically controlled by the scanning control module.

In the present invention, since the radiation source is the electronic linear accelerator which can produce much higher X-ray energy than the X-ray tube examining instrument, much powerful X-ray beam can penetrate through the container being inspected, so that a higher resolution is obtained and very clear image is formed. Therefore, it is easier and faster to view the inspection result. As the radiation source is the electronic linear accelerator, once the power supply is cut off, the radiation no longer emits from the radiation source, so it is very safe for the operators and the instrument.

The conveying device according to the present invention comprises both a roller conveyor and a chain-plank conveyor. When the bottom surface of the air cargoes is in engagement with the outermost roller of the loading roller conveyor, the roller conveyor begins to run. Being carried on the rollers, it is very easy for the air cargoes to be conveyed to the chain-plank conveyor. Since the idle transition means is arranged between the chain-plank conveyor and the roller conveyor, the air cargoes can stably conveyed from the roller conveyor to the chain-plank conveyor. The chain-plank conveyor circulates to carry the air cargoes to pass through the scanning tunnel. As the chain-plank conveyor run stably, a stable scanning image can be obtained.

In the present invention, a radiation shielding wall is divided into several pieces to perform the radiation protection. Each piece of the radiation shielding wall has a lead plate which is provided within the hollow steel frame of the radiation shielding wall (except the steel plate shielding wall). And the inner wall and the outer wall of the radiation shielding wall are provided with ribs thereon to make the radiation shielding wall stronger with a higher stiffness. As one radiation shielding wall is connected to another by a lap joint, the radiation shielding effect is not suffered by any air gap. In addition, each pieces of radiation shielding wall is transported before assembly, so it has no problem on any over long, over high, or over wide dimensions. With benefit of this on-site assembly structure, the workload for on-site construction is much lower, and the construction period is greatly shorten.

The radiation shielding wall makes the X-ray protection much better, so the system working area is much smaller.

It is suitable to use the chain-plank conveyor to carry the light palletized cargoes, while it is suitable to use the roller conveyor to carry the heavy container. In the present invention, both the chain-plank conveyor and the roller conveyor are employed, so that no matter for light or heavy cargoes, when they are carried to pass through the scanning tunnel, no relative displacement is made between the cargoes and their conveying device. Therefore, the unclear image resulted from the vibration of the cargoes will not occur.

Taking advantage of the base elements, it is easier for the portal-shaped frame to be assembled in site, and it is not necessary to build the basement in advance. Therefore, the construction efficiency is improved and the construction cost is lowered.

The two ends of the scanning tunnel are open, without the traditional mechanical doors. Therefore, the mechanical structure is simplified, so the scanning tunnel is more reliable and it is more convenience to be maintained.

The inspection system according to the present invention can be arranged in the air cargo conveying line, so that the air cargoes can be inspected during they are conveyed on the conveying line. Therefore, the air cargo conveying efficiency is not lowered for using the inspection system according to the present invention.

In a word, compared to the prior art, the present invention takes the advantages of reasonable structure, easy installation, convenient usage, fast inspection, and clear image. In addition, the inspection system according to the present invention is harmless for people.

Preferably, according to the present invention, all the air cargoes or vehicles can be fully inspected once passing through the inspection system. Objects hidden in any part of air cargoes or vehicles can all be found by the inspection system. The air cargoes or vehicles can pass through the inspection system as much as possible in a certain period of time. In addition, the inspection system according to the present invention only occupies a smaller area than the prior art inspection system.

BRIEF DESCRIPTION OF THE ACCOMPANYING DRAWINGS

FIG. 3 is a view showing the chain-plank conveyor and the roller conveyor of the inspection system for the air cargoes or vehicles according to the present invention.

FIG. 4 is a view showing how the air cargoes can get on and off the chain-plank conveyor according to the present invention.

DETAILED DESCRIPTION OF THE PREFERRED EMBODIMENTS

Figure 1:
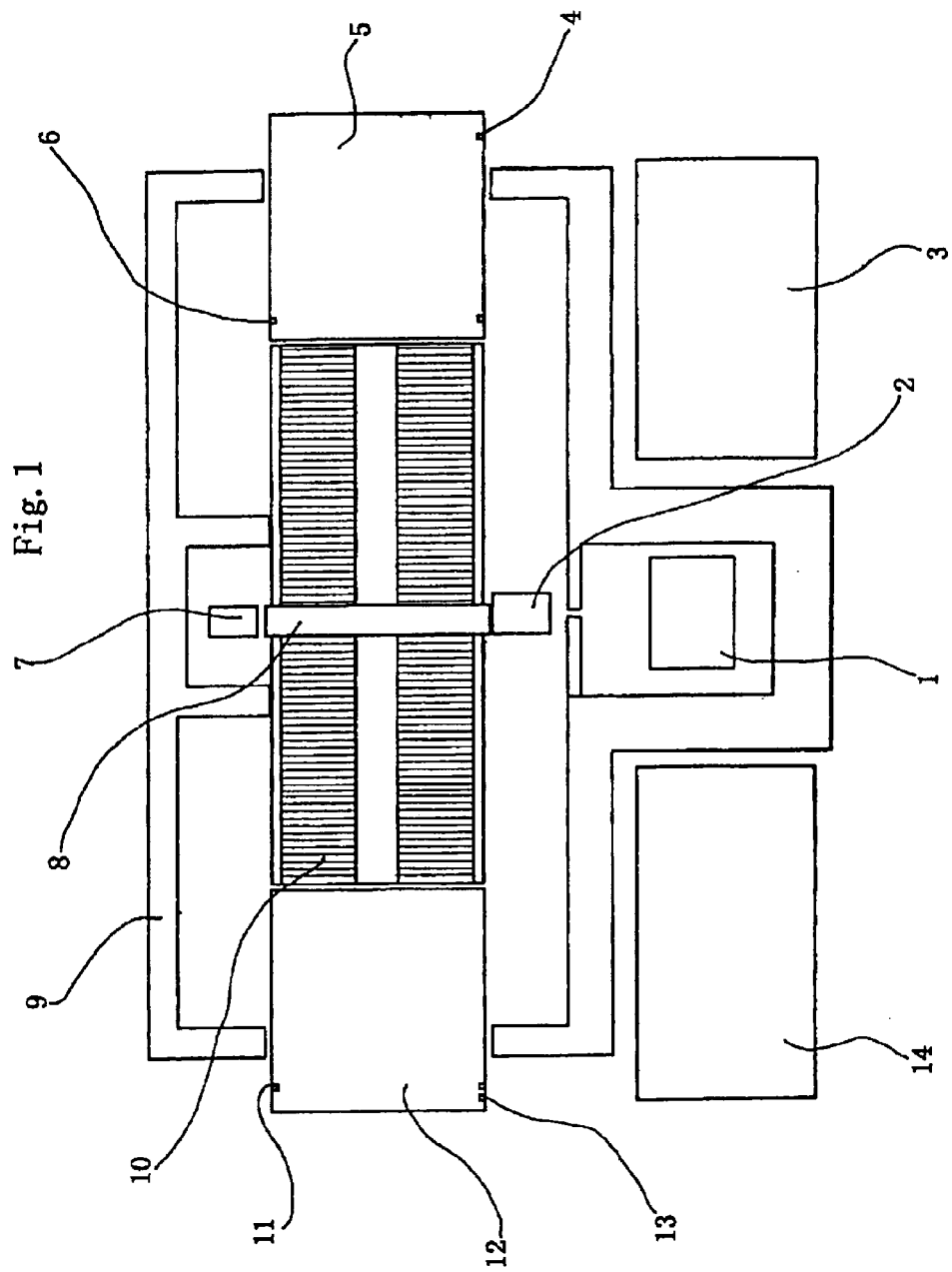
FIG. 1 is a plan view of the inspection system according to the present invention.
Figure 2:
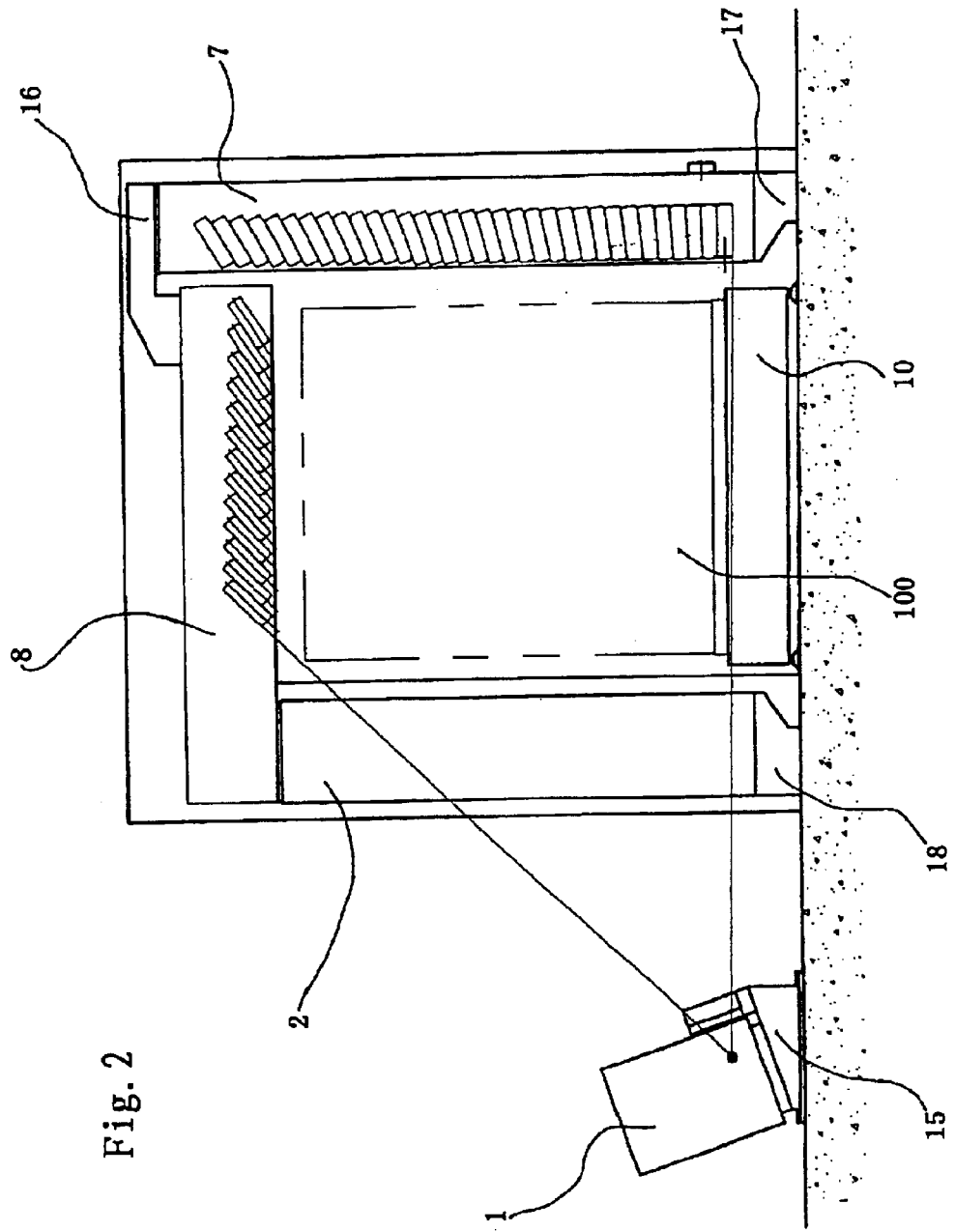
FIG. 2 is a cross-section view of the inspection system according to the present invention.

As shown in FIGS. 1 and 2, an inspection system for air cargoes or vehicles with an accelerator as its radiation source mainly comprises an electronic linear accelerator 1, a collimator 2, a horizontal detector arm 8, a vertical detector arm 7, a conveying device comprising a chain-plank conveyor 10 and roller conveyors 5, 12, radiation shielding walls 9, an instrument cabin 14, and a workroom 3. The accelerator 1, the collimator 2 and the vertical detector arm 7 are respectively provided on the accelerator base 15, the collimator base 18 and the vertical detector arm base 17. The collimator 2 is provided between the conveying device and the accelerator 1. The horizontal detector arm 8 is supported by the upper end of the collimator 2. The vertical detector arm 7 is located in the side opposite to the accelerator 1. The horizontal detector arm 8 is provided over the conveying device. One end of the horizontal detector arm 8 is connected to the vertical detector arm 7 via the connecting body 16, while the other end of the horizontal detector arm 8 is supported by the collimator 2. A stable portal-shaped frame is formed by means of the collimator 2, the horizontal detector arm 8 and the vertical detector arm 7. Under the portal-shaped frame, the air cargoes are carried by the conveying device comprising roller conveyors 5, 12 and a chain-plank conveyor 10 to pass through the scanning tunnel. The scanning operation is controlled in the workroom 3 which is provided with a console. Radiation shielding walls 9 with lap joints are provided on both sides of the scanning tunnel. The radiation shielding wall 9 is a kind of steel frame with a lead plate sandwiched between the inner wall and the outer wall. In operation, after the power supply is ready, turn on the breaker of the electric cabinet for every subsystems, then use the key to turn on the power supply switch located on the control panel of the electric control cabinet to supply electric power for the electric control cabinet, so that the inspection system is started. On the panel, there are provided with function keys to enter such subsystems as the scanning control subsystem, the image data acquisition subsystem, the accelerator subsystem, the scanning unit subsystem, etc. Pressing down different function keys, the inspection system accesses different subsystems. When pressing down the function key for the scanning control subsystem, an indicator light is bright to show the scanning unit is ready for work, and the interface of the scanning control subsystem appears on the screen, so the operator can check whether everything is in its normal state. After making sure that nobody is left in the radiation area, the cargo's owner can press down the "loading" button 4 on the panel, so the loading rollers begin rotate in the forward direction. Once the container 100 reaches to the photoelectric switch 6, the loading is end, and the loading rollers stop. Therefore, the container stop moving forward, and the "end loading" indicator light on the panel becomes bright. As a result, the container is ready to be inspected. Then, the loading rollers and the chain-plank conveyor are both started so as to carry the container to move forward. When the container reaches to the scanning cross section, if every subsystems are ready to work, the safety interlock switch on the panel is on, so the accelerator 1 emits a conical X-ray beam which is transformed into a fan-shaped X-ray beam after passing through the collimator 2. In this time, the loading rollers stop, and the X-ray beam passing through the collimator 2 becomes the fan-shaped X-ray beam which is perpendicular to the floor. The tips of the detectors provided within the horizontal detector arm 8 and the vertical detector arm 7 are in the same plane as the fan-shaped X-ray beam. The X-ray beam radiated from the accelerator 1 penetrates the container being inspected, so as to be received by the detectors provided within the horizontal detector arm 8 and the vertical detector arm 7, then the X-ray beam received by the detectors is transformed into electrical signals which are input into the image data acquisition module provided in the instrument cabin 14 located outside of the scanning tunnel, then the image signals are transferred to the operation & inspection module by the image data acquisition module, then the image signals are transferred by the operation & inspection module to the computer in the workroom 3. As a result, the radiographic image of goods contained in the container is displayed on a computer screen on the panel of the workroom 3.

Whenever the container 100 leaves the scanning cross section, the accelerator stops emitting the X-ray beam. When the container reaches to the position of unloading photoelectric switch 11, the unloading rollers and the chain-plank conveyor stop. The container is ready for unloading, and the "ready for unloading" indicator light on the panel becomes bright. Then the unloading rollers rotate so as to automatically unload the container. After the container is fully unloaded, the unloading rollers stop. Normally the container will not stop moving during being scanned. In emergency, however, press down the "stop" button on the console to stop the scanning unit and turn off the power supply.

In addition, the technical solution according to the present invention can be used not only for the air cargoes, but also for their medium or small type carrying vehicle.

According to the present invention, the stable portal-shaped frame enclosed by the collimator, the horizontal detector arm and the vertical detector arm can also be used in the line of the container conveying rollers of the current airports to perform the inspection work.

Preferably, as shown in FIG. 3, the conveying device according to the present invention is composed of a roller conveyor 12 and a chain-plank conveyor 10, and an idle transition roller 102 is provided between the roller conveyor and the chain-plank conveyor. In order to prevent the return chains of the chain-plank conveyor 10 from hanging down, a supporting plate 103 is employed.

During inspection, the air cargoes 100 are carried by the rollers to be smoothly conveyed to the chain-plank conveyor which is stably circulated to carry the air cargoes to pass through the scanning cross-section. As the chain-plank conveyor run stably, a stable scanning image can be obtained.

As shown in FIG. 4, in the case of the inspection system according to the present invention is used for inspection of a vehicle, the chain-plank conveyor 10 of the conveying device is arranged in the air cargo conveying line. At the both ends of the chain-plank conveyor 10, there is provided with a transition means which facilitates the vehicle 101 to go up to the chain-plank conveyor from the air cargo conveying line or go down to the air cargo conveying line from the chain-plank conveyor. Said chain-plank conveyor 10 is set up on the floor, and said transition means is a wedge 110, which has an inclined surface to smoothly bridging the floor with the chain-plank conveyor.

Thus, by simply putting the chain-plank conveyor 10 on the floor and employing the wedges 110, the vehicle 101 can easily go up to the chain-plank conveyor from the air cargo conveying line or go down to the air cargo conveying line from the chain-plank conveyor. In this way, no cost for construction of the pit occurs, and no cost for construction of water draining system occurs. In addition, the cost for daily maintenance is also lowered. The construction cost of the inspection system according to the present invention is minimized.

Moreover, if possible, the chain-plank conveyor can be provided in a pit, so that the upper surface of the chain-plank conveyor can be kept in the same level as the floor and the transition means is simplified as a bridging plate. In this case, the vehicle is easier to access to the chain-plank conveyor.

What is claimed is:

1. An inspection system for air cargoes, in which an accelerator, a collimator, and a vertical detector arm are all mounted on a floor; detectors are provided within both a horizontal detector arm and the vertical detector arm; the accelerator, the collimator, the horizontal detector arm and the vertical detector arm are provided in a same plane; the horizontal detector arm is supported by an upper end of the collimator; the vertical detector arm and the horizontal detector arm are connected to each other and provided in the side opposite to the accelerator; a stable portal-shaped frame is formed by means of the collimator, the horizontal detector arm and the vertical detector arm; a conveying device is located under the horizontal detector arm, being perpendicular to the portal-shaped frame, the collimator is provided between the conveying device and the accelerator; and a scanning tunnel is enclosed by the portal-shaped frame and the conveying device, wherein;

the conveying device is composed of roller conveyors and a chain-plank conveyor, one of the roller conveyors is respectively provided at each of the two ends of the chain-plank conveyor, and an idle transition roll is used to smoothly bridge the roller conveyors and the chain-plank conveyor.

2. The inspection system for air cargoes as claimed in claim 1, wherein the accelerator, the collimator and the vertical detector arm are respectively provided with an accelerator base, a collimator base and a vertical detector arm base.

3. The inspection system for air cargoes as claimed in claim 1, wherein radiation shielding walls are provided on both sides of the scanning tunnel.

4. The inspection system for air cargoes as claimed in claim 1, wherein the inspection system further comprises an instrument cabin and a workroom, the instrument cabin and the workroom are provided outside of the radiation shielding wall with respect to the scanning tunnel, the instrument cabin is provided with a scanning control module, an image data acquisition module and an operation and inspection module, and workroom is provided with a console and its control system.

5. The inspection system for air cargoes as claimed in claim 1, wherein the two ends of the scanning tunnel are open, and an electrical sensor alarming element is provided at each end of the scanning tunnel.

6. An inspection system for vehicles, in which an accelerator, a collimator, and a vertical detector arm are all mounted on the floor; detectors are provided within both a horizontal detector arm and the vertical detector arm, the accelerator, the collimator, the horizontal detector arm and the vertical detector arm are provided in a same plane; the horizontal detector arm is supported by the upper end of the collimator; the vertical detector arm and the horizontal detector arm are connected to each other and provided in a side opposite to the accelerator; a stable portal-shaped frame is formed by means of the collimator, the horizontal detector arm and the vertical detector arm; a conveying device is located under the horizontal detector arm, being perpendicular to the portal-shaped frame; the collimator is provided between the conveying device and the accelerator; and a scanning tunnel is enclosed by the portal-shaped frame and the conveying device, wherein;

the conveying device is a chain-plank conveyor which is arranged in an air cargo conveying line; and at both ends of the chain-plank conveyor, there is each provided with a transition means which facilitates vehicles to go up to the chain-plank conveyor from the air cargo conveying line or go down to the air cargo conveying line from the chain-plank conveyor.

7. The inspection system for vehicles as claimed in claim 6, wherein the chain-plank conveyor is set up on a floor, and the transition means is a wedge which has an inclined surface to smoothly bridging the floor with the chain-plank conveyor.

8. The inspection system for vehicles as claimed in claim 6, wherein the chain-plank conveyor is provided in a pit, so that the upper surface of the chain-plank conveyor is kept in the same level as the floor and the transition means is a bridging plate.

* * * * *